March 10, 1925.
A. WESTGARD
DADO CUTTER
Filed Oct. 4, 1922
1,529,382
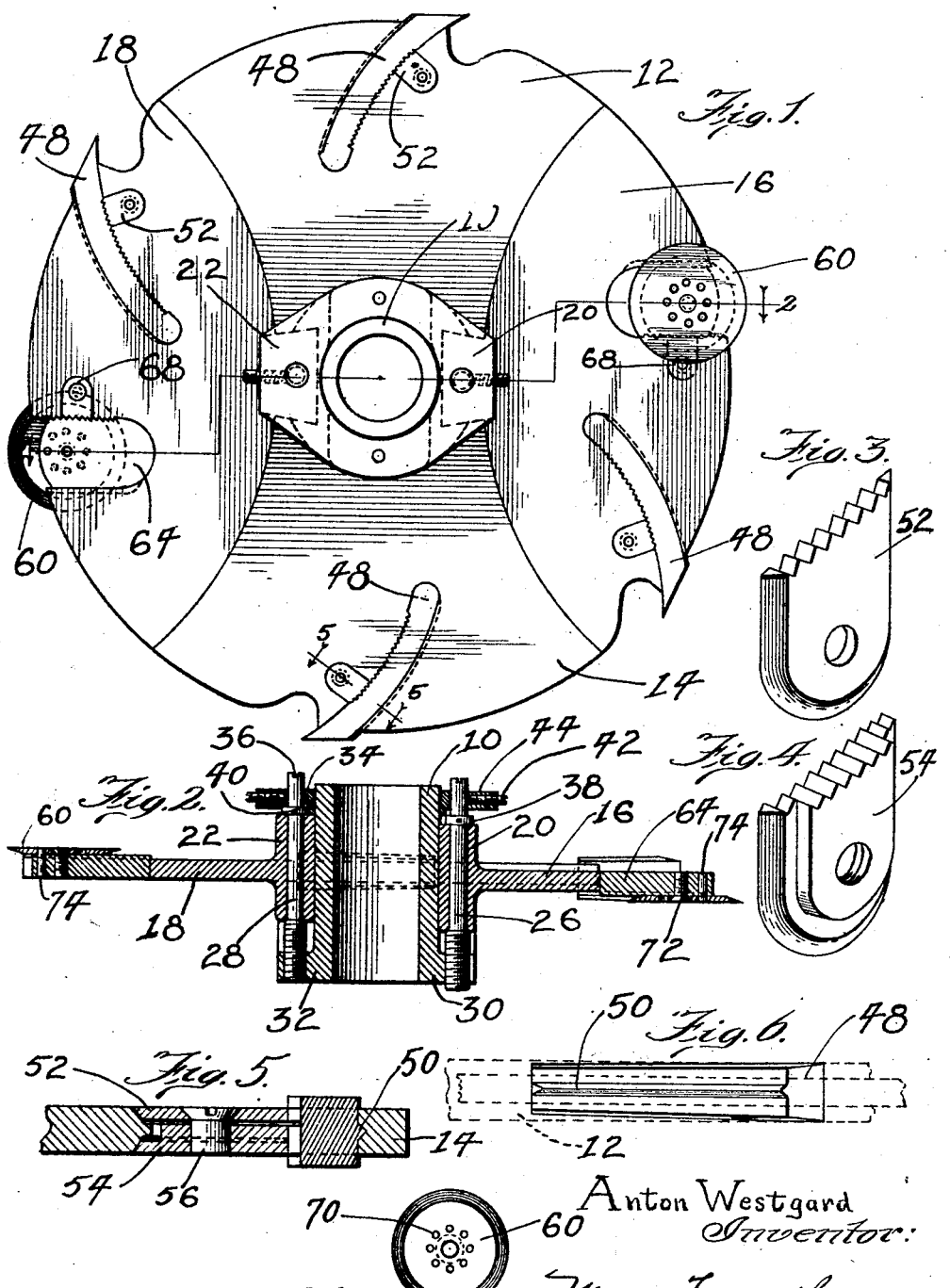
Anton Westgard
Inventor:
By Mason, Fenwick & Lawrence
Attys Patented Mar. 10, 1925.

1,529,382

UNITED STATES PATENT OFFICE.

ANTON WESTGARD, OF CHICAGO, ILLINOIS.

DADO CUTTER.

Application filed October 4, 1922. Serial No. 592,437.

*To all whom it may concern:*

Be it known that I, ANTON WESTGARD, a citizen of the United States, residing at 9 S. Clinton St., Chicago, in the county of Cook and State of Illinois, have invented certain new and useful Improvements in Dado Cutters; and I do hereby declare the following to be a full, clear, and exact description of the invention, such as will enable others skilled in the art to which it appertains to make and use the same.

This invention relates to improvements in dado cutters, or cutters for grooving or cutting wood or the like, particularly cross grain, and has for its particular object the provision of such a cutter which shall be in the form of a circular saw, the width of which is adjustable so that cuts or grooves of any desired width between certain limits may be readily made.

One of the important objects of this invention is the provision of a dado cutter or circular saw in which the cutting elements are made removable and adjustable, so that the saw teeth and cutters may be made of a high speed of steel, which will require less sharpening, and not such a great degree of care.

Another object of this invention is the provision of a dado cutter or circular saw provided with removable teeth adapted for cutting various woods which shall be adjustable so that the widths of the cuts can be varied as desired, but which shall be free from all objectionable vibrations, so that true and accurate lines of cuts may be made at all times.

Another important object of this invention is the provision of a dado cutter or circular saw having removable and adjustable teeth, mounted on the circumference thereof, and in addition to such teeth removable and adjustable knife edges in the shape of cutting discs, which shall cooperate with the teeth to produce a better cutting action, and which shall be so positioned in the saw proper that the edge thereof may be renewed from time to time, as the same becomes dull, without necessitating the removal of the disc from the saw.

Still another important object of this invention is the provision in a dado cutter or circular saw having removable teeth and auxiliary cutting discs and securing means providing connections therefor, whereby the teeth and cutting discs may be radially adjusted with respect to the circumference of the saw so that the same may be used for quite a length of time regardless of wear, sharpening and the like, and which shall be firmly held in position at all times, and regardless of the location thereof with respect to the circular edge of the saw.

Other and further important objects of the invention will be apparent from the disclosures in the accompanying drawings and following specification.

The invention, in a preferred form, is illustrated in the drawings, and hereinafter more fully described.

In the drawings: Fig. 1 is a side elevation of the improved dado cutter or circular saw of this invention.

Fig. 2 is a sectional view taken on the broken line 2—2 of Fig. 1.

Fig. 3 is a perspective view showing the construction of one of the retaining members for the saw teeth and circular cutters.

Fig. 4 is a perspective view showing a corresponding element of the retaining member which coacts with that shown in Fig. 3.

Fig. 5 is a sectional view taken on the line 5—5 of Fig. 1, looking in the direction indicated by the arrows.

Fig. 6 is a longitudinal elevation of one of the saw teeth showing in dotted lines its application to the saw blade.

Fig. 7 is a side elevation of one of the circular auxiliary cutting members.

As shown in the drawings, the reference numeral 10 indicates the hub of a circular saw, which is adapted to be positioned upon a revolving shaft in an obvious manner. Integral with the hub 10 are two segments 12 and 14 which form a part of the disc of the saw proper. As best shown in Fig. 1 these extensions 12 and 14 are bounded by curved lines forming segments of a continuous circle which is cut off to permit of the positioning into cooperative relation therewith of additional members 16 and 18, which, as best shown in Fig. 1, complete the circle of the saw disc. These members 16 and 18 are of a thickness to correspond approximately to the thickness of the integral members 12 and 14, but instead of being integral with the hub 10 are slidably positioned thereon so as to be movable longitudinally with respect thereto. This is accomplished by means of lugs or extensions 20 and 22 integral with the members 16 and 18 respectively, and fitting slidably in dove-tailed grooves formed in the sides or extensions of the hub or bearing sleeve 10.

In order to maintain the auxiliary disc segments 16 and 18 in desired relation to the original disc members 12 and 14 and in proper longitudinal position on the hub 10 to regulate the width of the cut desired, adjusting screws 26 and 28 are provided having screw threaded ends mounted in corresponding screw-threaded openings in lugs 30 and 32 integral with the hub 10 and extending laterally therefrom.

The adjusting screws 26 and 28 extend longitudinally through the extensions 20 and 22 respectively of the auxiliary disc members 16 and 18 and are rotatable therein. The upper ends of the adjusting screws 26 and 28 pass freely through openings in corresponding extensions 34, which fit into the dove-tailed grooves in the hub shaft, and slide freely therein, and the upper end of the screw members 26 and 28 are slotted, as shown at 36, to provide for the insertion of the end of a screw driver or the like, by means of which the position of same may be readily adjusted with respect to the hub 10. Collar members 38 are provided, fitted onto the screws 26 and 28, so as to establish at all times a close relation between the screw members 26 and 28, and the corresponding lugs 20 and 22. The collars 38 are securely fixed to the screw members by means of pins 40 or the like so that there is no possibility of their becoming loose in operation. Set screws 42 are further provided in extensions 44 of the lugs 34, whereby the adjusting screws 26 and 28 may be securely locked in desired position. It will be seen that by means of the operation of the adjusting screws 26 and 28 the relation of the auxiliary disc segments 16 and 18 with respect to the hub 10 and the disc segments 12 and 14 may be varied as desired in order to obtain a wider cut in the material operated on. The fit of the members 20 and 22 in the dove-tail grooves in the hub 10, together with the relation to the adjusting screws 26 and 28 in such that there is no possibility of their becoming loose or vibrating while in use, and the cut will be straight and true.

Each of the disc segments 12, 14, 16 and 18 is provided with a saw tooth as shown at 48 in Fig. 1, which saw tooth is preferably composed of some high speed metal and is removably and adjustably mounted in a slot or groove formed in the material of the disc member itself. One face of each saw tooth 48 is provided with serrations or notches, as shown in Fig. 5, so that it may be conveniently locked in adjusted position in its slot, by means of locking members having teeth corresponding to the serrations, which locking members are constructed in two parts, as shown in Figs. 3 and 4, the combined thickness of the two parts being approximately equal to the thickness of the disc itself. These are maintained in secure relation with the disc members and the saw teeth 58 by means of a screw through the members 52 and 54.

The construction of the saw teeth and the means for retaining the same in position has been fully described in my co-pending application for U. S. Letters Patent on saw construction, Serial No. 526,217, filed December 21, 1921, and further details of construction will be omitted here. The angular relation of the saw teeth 48 to the plane of the disc segments 12, 14, 16 and 18 is such that the teeth dress alternately right and left to a slight degree, as best shown in Fig. 6. This provides for a more accurate and efficient action of the saw itself, and prevents any burning, binding, or objectionable vibration which might otherwise be present, and eliminates setting or swaging each tooth which would otherwise be necessary, practically after every filing.

Cooperating with the saw teeth and preferably mounted on the removable disc segments 16 and 18 are circular cutting members 60, rotatably mounted on plates adapted to be fitted in corresponding sockets in the disc segments 16 and 18, as shown at 64, and which are removably and adjustably positioned in the segments by means of attaching members 68 similar to the attaching means 52—54, heretofore described. In addition, as best shown in Fig. 7 each of the circular cutting members 60 is provided with a series of openings 70, extending around the center of same and adjacent the inner portion thereof. Screws 72 are provided whereby the circular cutting members 60 are rotatably, but positively mounted in their corresponding attaching means 64, and in addition a pin 74 passes through one of the openings 70 into a corresponding opening in the member 64, so that the relation of the edge of the cutting discs 60 may be adjusted with relation to the edge of the saw or circular segments 16 and 18. This provides for the renewal of the cutting edge of a circular disc 60 whenever the same becomes dull, without necessitating its removal, and a new edge can be presented merely by removing the screw 72 and pin 74, and inserting the pin in a new hole 70.

As will be seen, the radial relation of both the teeth and the cutting members 62 can be adjusted relatively to the saw edge so that as the same become worn down through use or continuous sharpening, adjustment may be made whereby new cutting edges may be presented without necessitating the renewal of these parts. Herein is provided a saw which will have a particularly long life, as the cutting member can be readily sharpened and renewed when worn out, leaving the body of the saw as an original element, which can be used with a very great number of successive cutting members, as contrasted with the ordinary disc saws now on the market, which become useless and must be discarded at great expense, after a comparatively short period of time. Further, the effective cutting width of the saw may be varied as desired to quite a considerable degree, as shown in Fig. 2, as the segment 16 may be lowered to the limit of movement of the groove 26 and the opposite segment 18 may be raised to the other limit of movement of the screw 28, and vice versa, whereby a particularly wide cut may be attained.

I am aware that many changes may be made, and numerous details of construction varied throughout a wide range without departing from the principles of this invention, and I, therefore, do not purpose limiting the patent granted hereon otherwise than as necessitated by the prior art.

I claim as my invention:

1. A dado cutter comprising a hub, fragmentary circular saw segments integral with said hub, complementary disc segments removably and adjustably mounted on said hub, and means for securing said complementary segments in adjusted relation to the hub, said means comprising adjusting screws mounted in screw-threaded sockets in the hub, transversely extending lugs integral with the complementary disc segments, and openings in said lugs adapted to permit of the insertion and rotation of said adjusting screws.

2. A dado cutter comprising a hub, fragmentary circular saw segments integral with said hub, complementary disc segments removably and adjustably mounted on said hub, and means for securing said complementary segments in adjusted relation to the hub, said means comprising adjusting screws mounted in screw-threaded sockets in the hub, transversely extending lugs integral with the complementary disc segments, openings in said lugs adapted to permit of the insertion and rotation of said adjusting screws, and means for locking said adjusting screws in adjusted relation to the hub.

In testimony whereof I affix my signature.

ANTON WESTGARD.